(12) United States Patent
Zhu

(10) Patent No.: US 9,285,598 B2
(45) Date of Patent: Mar. 15, 2016

(54) DISPLAY APPARATUS

(71) Applicant: Boe Technology Group Co., Ltd., Beijing (CN)

(72) Inventor: Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 102 days.

(21) Appl. No.: 14/096,747

(22) Filed: Dec. 4, 2013

(65) Prior Publication Data

US 2014/0184961 A1 Jul. 3, 2014

(30) Foreign Application Priority Data

Dec. 13, 2012 (CN) .......................... 2012 1 0540941

(51) Int. Cl.
| | |
|---|---|
| *G02F 1/1335* | (2006.01) |
| *G02B 27/22* | (2006.01) |
| *H04N 13/04* | (2006.01) |
| *G02B 5/18* | (2006.01) |
| *G02B 27/42* | (2006.01) |

(52) U.S. Cl.
CPC .......... *G02B 27/2214* (2013.01); *G02B 5/1885* (2013.01); *G02B 27/4205* (2013.01); *G02F 1/133504* (2013.01); *H04N 13/0402* (2013.01); *H04N 13/0409* (2013.01)

(58) Field of Classification Search
CPC ................... G02F 1/133504; G02B 27/22114; G02B 27/4205; H04N 13/0404; H04N 13/0402; H04N 13/0409
See application file for complete search history.

(56) References Cited

U.S. PATENT DOCUMENTS

| | | | | |
|---|---|---|---|---|
| 4,790,632 A | * | 12/1988 | Miyakawa et al. ............. | 349/95 |
| 2007/0030552 A1 | | 2/2007 | Sumiyoshi et al. | |
| 2012/0307168 A1 | * | 12/2012 | Dong et al. .................... | 349/15 |

FOREIGN PATENT DOCUMENTS

| | | |
|---|---|---|
| CN | 1109600 A | 10/1995 |
| CN | 2636278 Y | 8/2004 |
| CN | 2006330149 A | 12/2006 |
| CN | 1922516 A | 2/2007 |
| CN | 102749761 A | 10/2012 |
| CN | 202939390 U | 5/2013 |
| JP | 2006330149 A | 12/2006 |

OTHER PUBLICATIONS

English translation of Office Action in corresponding Chinese Application No. 2012105409415, dated Sep. 29, 2014.
English translation of Office Action dated Feb. 6, 2014, for corresponding Chinese Application No. CN201210240941.5.
The Third Office Action mailed Jun. 12, 2015 for Chinese Patent Application No. 201210240941.5.

* cited by examiner

*Primary Examiner* — Dung Nguyen
(74) *Attorney, Agent, or Firm* — Kinney & Lange, P.A.

(57) ABSTRACT

A display apparatus is disclosed which comprises a plurality of layers arranged in a light emitting direction of a light source, wherein a diaphragm layer configured to enhance an emitting brightness of the display apparatus is arranged on one of the plurality of layers. With such diaphragm layer in the display apparatus, the brightness of the display apparatus can be enhanced by the Fresnel diffraction effects of the diaphragm layer. In the 2D display, for a same brightness, the power consumption in the display apparatus may be reduced. In the 3D display, the brightness of the display apparatus may be improved and the crosstalk may be reduced.

15 Claims, 4 Drawing Sheets

DISPLAY APPARATUS

CROSS-REFERENCE TO RELATED APPLICATION

This application claims the benefit of Chinese Patent Application No. 201210540941.5 filed on Dec. 13, 2012 in the State Intellectual Property Office of China, the whole disclosure of which is incorporated herein by reference.

BACKGROUND OF THE INVENTION

1. Field of the Invention

The present invention relates to a display technical field, more particularly, relates to a display apparatus.

2. Description of the Related Art

The active Bather 3D technology, which may perform 2D/3D switching, is widely applied in LCDs (liquid crystal display) at present. It may be implemented easily; however, it may cause the display has a low brightness of 3D image. Some solutions of improving the brightness have been proposed, for example, as follows:

(1). an arrangement in which the illumination is directly carried out by LED lamps from bottom, which may improve the display brightness significantly;

(2). use of a diffuse plate and optical film layers, which may improve uniformity of display brightness efficiently and may use the light emitted from a background light source sufficiently.

However, each of the above solutions has disadvantages. In particular, the above solution (1) needs extra energy and thus causes additional power consumptions of the display apparatus; and the above solution (2) needs at least two additional film layers such that the structure becomes complicated and the cost increases.

For a 2D display apparatus, its display brightness needs the electrical consumption of the background light source. Thus, when a high brightness is desired, the electrical consumption of the background light source will increase to enhance the power consumption of the display apparatus.

SUMMARY OF THE INVENTION

The present invention has been made to overcome or alleviate at least one aspect of the above mentioned disadvantages.

Accordingly, it is an object of the present invention to provide a display apparatus with simple constructions, low power consumption and high brightness.

According to an aspect of the present invention, a display apparatus is provided, the display apparatus comprising a plurality of layers arranged at downstream in a light emitting direction of a light source, wherein a diaphragm layer configured to enhance an emitting brightness of the display apparatus is arranged on one of the plurality of layers.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
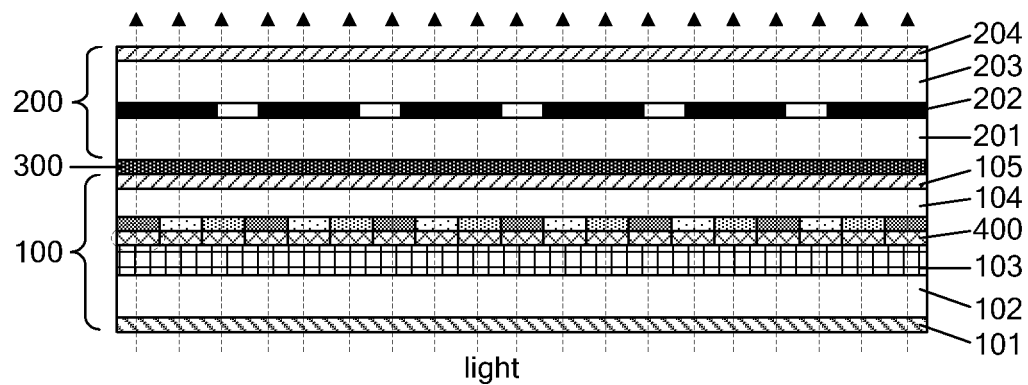
FIG. 1 is a schematic cross sectional view of a display apparatus according to a first exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In order to improve the brightness of the display apparatus, as a general invention concept of the present invention, a diaphragm layer is arranged on one of a plurality of layers of the display apparatus to enhance an emitting brightness of the display apparatus. With such arrangement, the emitting brightness of the display apparatus may be enhanced on basis of the Fresnel diffraction principle and the Hyugens-Fresnel rule. In the present invention, the light source for the display apparatus may comprise an external light source or a background light assembly of display apparatus. If the background light assembly is used as the light source, the diaphragm layer may be located on any one layer of the plurality layers between a background light source of the background light assembly and an emitting surface of the display apparatus, for example, the diaphragm layer may be arranged between any two layers, arranged on an outer surface of the outermost layer at the light incident side, or arranged on an outer surface of the outermost layer at the light emitting side. Alternatively, if the external light source is used as the light source of the display apparatus, the diaphragm layer may be arranged between any two layers of the display apparatus.

In an exemplary embodiment, the display apparatus includes a display substrate which includes a first liquid crystal layer in the plurality of layers, the diaphragm layer being arranged at downstream in the light emitting direction of the first liquid crystal layer. As an example, the embodiment will explained below with reference to a 3D display apparatus, as shown in FIG. 1. The display apparatus according to the present embodiment includes a display panel 100, a 3D assembly and an adhere layer 300. In an exemplary embodiment of the present invention, the 3D assembly comprises a 3D grating. Furthermore, the 3D grating may be provided as a front end construction, i.e., the 3D grating 200 may be arranged at the emitting side of the display panel 100. The display panel 100 further includes an array substrate 102 arranged at the light incident side of a first liquid layer 103; a color film substrate 104 arranged at the light emitting side of the first liquid crystal layer 103; and a first polarizer 105 arranged at the light emitting side of the color filter substrate 104.

In order to enhance the brightness of the display apparatus in 3D display mode, a diaphragm layer 400 is provided on the lower face of the color film substrate 104. That is, the diaphragm layer 400 is located between the color filter substrate 104 and the first liquid crystal layer 103. The diaphragm layer 400 may be composed of one single diaphragm. It may also be composed of an array of several diaphragms, each of which may correspond to one or more of sub pixels of the first liquid crystal layer 103. The diaphragm layer comprising all of diaphragms may cover all of the sub pixels. In an exemplary embodiment, each of the diaphragms corresponds to a row of sub pixels driven by a common data line, i.e., the light emitted from the corresponding sub pixels of the first liquid crystal layer 103 passes through the diaphragm to enhance the brightness. In the present embodiment, the diaphragm layer 400 includes a plurality of diaphragms, and the projection of each diaphragm on the first liquid crystal layer 103 covers a row of areas in which the sub pixels driven by the common date line are located, i.e., each of the diaphragms corresponds to a row of sub pixels.

Figure 2:
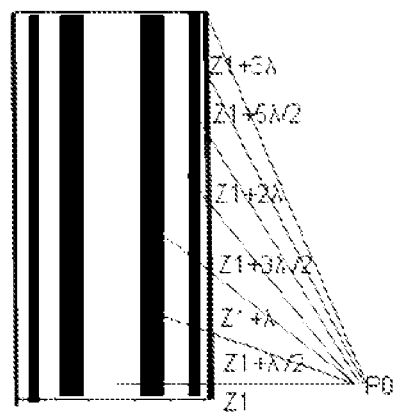
FIG. 2 is a schematic view showing the optical nature principles of the diaphragm layer shown in FIG. 1.
Figure 3:
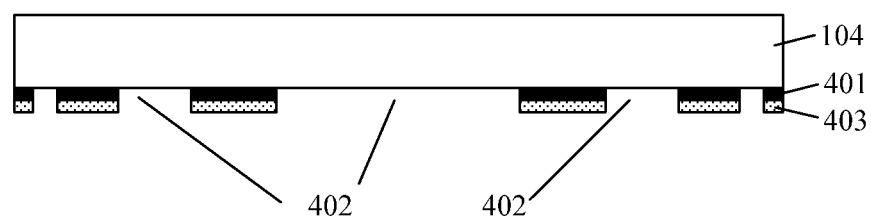
FIG. 3 is a schematic cross sectional view of a diaphragm of the diaphragm layer shown in FIG. 1.

The structure of each of the diaphragms is schematically illustrated in FIGS. 2-3. The diaphragm includes a substrate and n (n≥2) masking bars formed on the substrate. A slit is formed between two adjacent masking bars. The diaphragm may be fabricated by forming the masking bars on a separate substrate and then arranging it below the color film substrate 104. For easy fabrication, in the present embodiment, the color film substrate 104 is used as the substrate for the diaphragm and the masking bars 401 are formed directly on its lower face. The slit 402 is formed between two adjacent masking bars. With such process, costs and procedures may be reduced. Certainly, the diaphragm may also be formed by adhering a separate layer of masking bars to the substrate.

Figure 4:
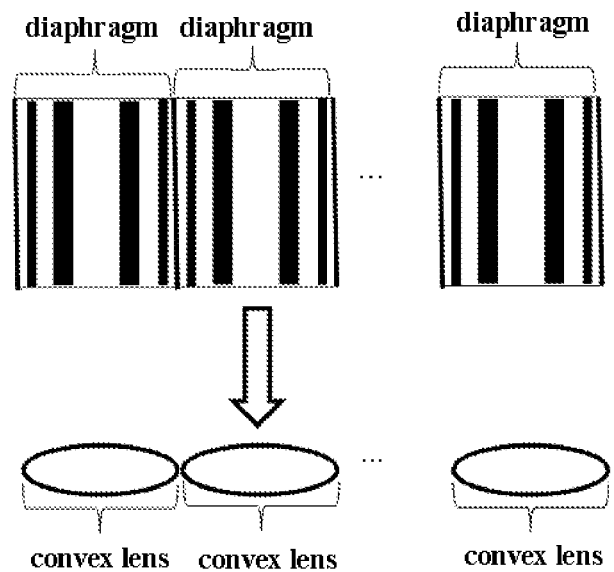
FIG. 4 is a schematic view showing the principles of effects of the diaphragm layer similar to convex lens effects.

The diaphragm mainly depends on the Fresnel diffraction principle and the Hyugens-Fresnel rule. Such Fresnel diffraction diaphragm structure has the same function of converging light rays as a convex lens and thus it may enhance the brightness. As illustrated in FIG. 4, each diaphragm is equal to one convex lens for converging light. The widths of the masking bars 401 and the slit 402 of the diaphragm may be determined on basis of the rule that the distances of two adjacent strip-like wavebands from a focal point (a focal point of the equivalent convex lens) P0 have a difference of $\lambda/2$, in which $\lambda$ is a wavelength of the light. As shown in FIG. 2, it is assumed that the diaphragm has six wavebands and Z1~Z1+3λ are distances from the centers of the respective wavebands to the focal point P0 (the centers of the respective wavebands and the focal point P0 are located in a common horizontal place), respectively. The diaphragm according to the present invention is constructed such that odd wavebands permit the incident light to pass while even wavebands mask the incident light, and thus combination amplitudes generated by the respective wavebands which permit the light to pass will be superposed in phase at the focal point P0 (central position), so that the amplitude and intensity at the point focal P0 are increased significantly. For example, the diaphragm contains 20 wavebands such that ten odd wavebands such as 1, 3, 5, . . . , 19 permit the incident light to pass while ten even wavebands such as 2, 4, 6, . . . 20 block the incident light, then the amplitude at the focal point is:

$$|\tilde{E}|=|\tilde{E}_1|+|\tilde{E}_3|+\ldots+|\tilde{E}_{19}|\approx10|\tilde{E}_1|=20|\tilde{E}_\infty| \quad (2)$$

The intensity at the focal point is:

$$I\approx(20|\tilde{E}_\infty|)^2=400I_\infty \quad (2)$$

wherein $|\tilde{E}_\infty|$ an amplitude at the point P0 if the diaphragm is absent, and $I_\infty$ is an intensity at the point P0 if the diaphragm is absent.

Figure 5:
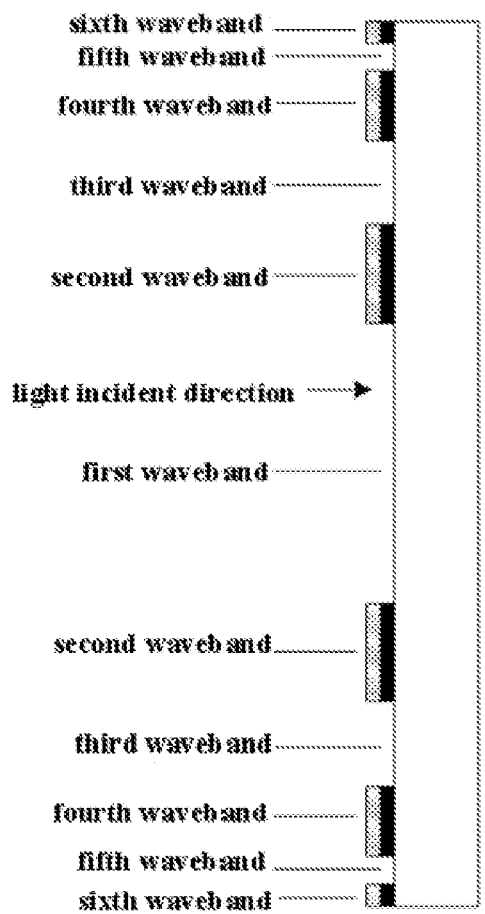
FIG. 5 is a schematic view showing the respective wavebands of the diaphragm shown in FIG. 3.

As illustrated in FIG. 5, for example, the diaphragm has six wavebands. The first waveband permits the incident light to pass. The second waveband masks the incident light. The third waveband permits the incident light to pass. The fourth waveband masks the incident light. The fifth waveband permits the incident light to pass. The sixth waveband masks the incident light. That is, the odd wavebands permit the incident light to pass while the even wavebands prevent the incident light from passing. In accordance with equations (1) and (2), the intensity will become 36 times greater than the intensity without the diaphragm, i.e., $I\approx(6|\tilde{E}_\infty|)^2=36\,I_\infty$. It can be seen that the brightness may be enhanced significantly by the diaphragm.

Figure 6:
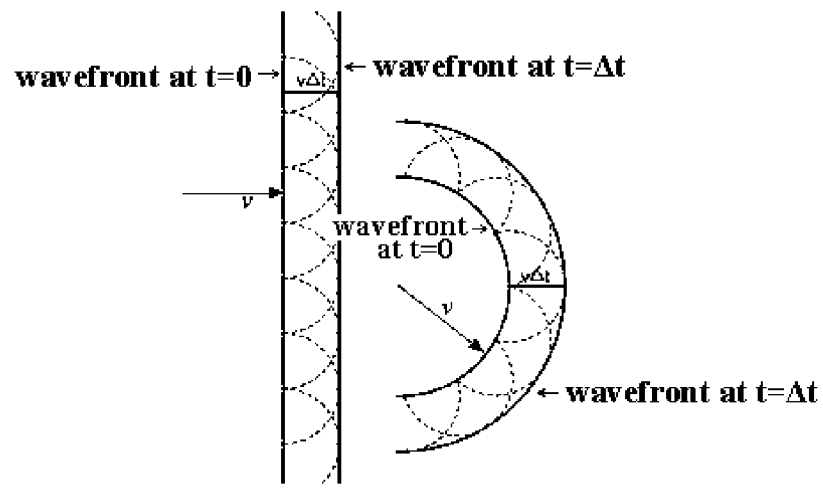
FIG. 6 is a schematic view showing propagation statuses of optical waves upon passing through the diaphragm slit.

In the display apparatus according to the present invention, the diffraction principle for the incident light at the diaphragm is shown in FIG. 6. Due to a narrower slit of the diaphragm, the incident light is diffracted to cause the sub waves of the incident light to be superposed by phase, thus the brightness of the light having passed through the diaphragm may be enhanced instead of being attenuated by masking of the diaphragm. At the same time, it can be seen that the light having passed through the diaphragm become converged relatively and thus the crosstalk of light between adjacent pixels may be reduced. In order to improve the utilization coefficient of the light, further, as shown in FIG. 3, a reflection layer 403 is provided on the lower face of the masking bar 401 (the face facing away from the light emitting side of the display panel 100, i.e., the facing towards the incident direction of the light). The reflection layer 403 may be made from reflecting materials such as metals. The light which does not pass through the diaphragm can be reflected for reutilization. The reflection layer 403 arranged below the diaphragm layer can reflect the light at the surface of the reflection layer 403 such that the light can be assigned again for reutilization.

In accordance with an embodiment of the present invention, as shown in FIG. 1, the 3D grating is arranged at the light emitting side of the first polarizer 105. In particular, the 3D grating includes a lower substrate 201 arranged at a light emitting side of the first polarizer 105 and a second liquid crystal layer 202 arranged at a light emitting side of the lower substrate 201. The lower substrate 201 is bonded to the first polarizer 105 of the display substrate 100 by an adhere layer 300. The diaphragm layer 400 is arranged between the color film substrate 104 and the first liquid crystal layer 103. The display panel 100 further includes a second polarizer 101 arranged at a side of the array substrate 102 opposed to the first liquid crystal layer 103. On the other hand, the 3D grating may further include an upper substrate 203 arranged at a side of the second liquid crystal layer 202 opposed to the lower substrate 201 and a third polarizer 204 arranged at a side of the upper substrate 203 opposed to the second liquid crystal layer 202.

Thus, in case that the display apparatus according to the first exemplary embodiment of the present invention is placed as shown in FIG. 1, the display panel 100 includes the second polarizer 101, the array substrate 102, the first liquid crystal layer 103, the color filter substrate 104 (three colors (red-green-blue) filter corresponding to each of sub pixels on the color filter substrate 104 is also shown) and the first polarizer 105, in order from bottom to top. The lower substrate 201 of the 3D grating 200 is adhered to the first polarizer 105 of the display panel 100 by the adhere layer 300. The 3D grating 200 includes the lower substrate 201, the second liquid crystal layer 202, the upper substrate 203 and the third polarizer 204 in order from bottom to top.

As discussed above, in the display apparatus according to the first embodiment of the present invention, the diaphragm layer 400 is arranged between the first liquid crystal 103 and the color film substrate 104 of the display panel 100, but the invention is not limited thereto. Based on the general concept of the present invention, the diaphragm layer 400 may be arranged on any one layer of the plurality of layers of the display apparatus, for example, arranged between any two layers, arranged on the surface of the display panel at the light incident side or at the light emitting side, or arranged on the surface of the 3D grating at the light incident side or at the light emitting side. In particular, the diaphragm layer 400 may be located between the display panel 100 and the 3D grating 200, in the plurality of layers of the display panel 100 or in the plurality of layers of the 3D grating 200.

Figure 7:
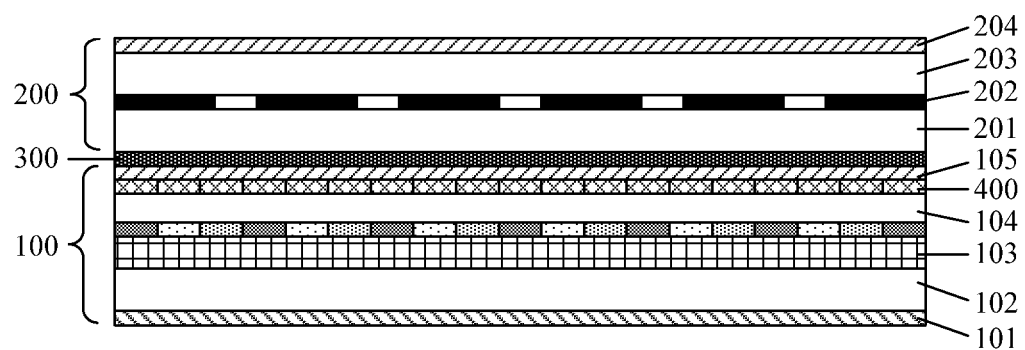
FIG. 7 is a schematic cross sectional view of a display apparatus according to a second exemplary embodiment of the present invention.

FIG. 7 is a schematic cross sectional view showing the display apparatus according to the second exemplary embodiment of the present invention, in which, the diaphragm layer 400 may be arranged between the first polarizer 105 and the color filter substrate 400 of the display panel 100.

Figure 8:
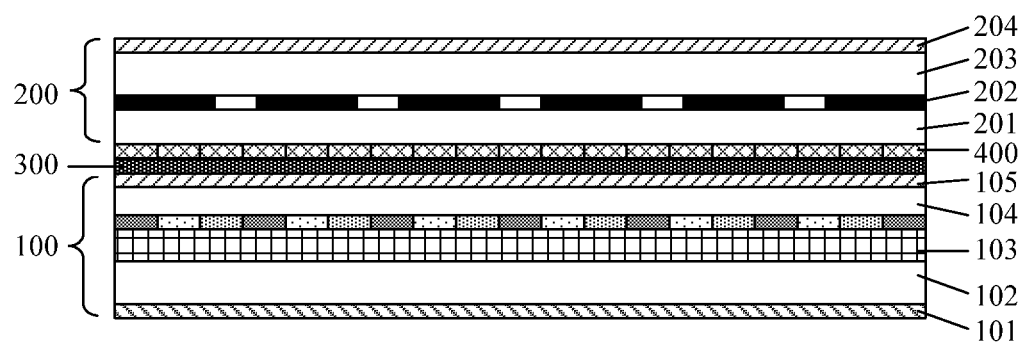
FIG. 8 is a schematic cross sectional view of a display apparatus according to a third exemplary embodiment of the present invention.

FIG. 8 is a schematic cross sectional view showing the display apparatus according to the third exemplary embodiment of the present invention, in which, the diaphragm layer 400 is arranged at the side of the lower substrate 201 of the 3D grating 200 opposed to the second liquid crystal layer 202 and is adhered to the first polarizer 105 of the display panel 100 by the adhere layer 300.

Figure 9:
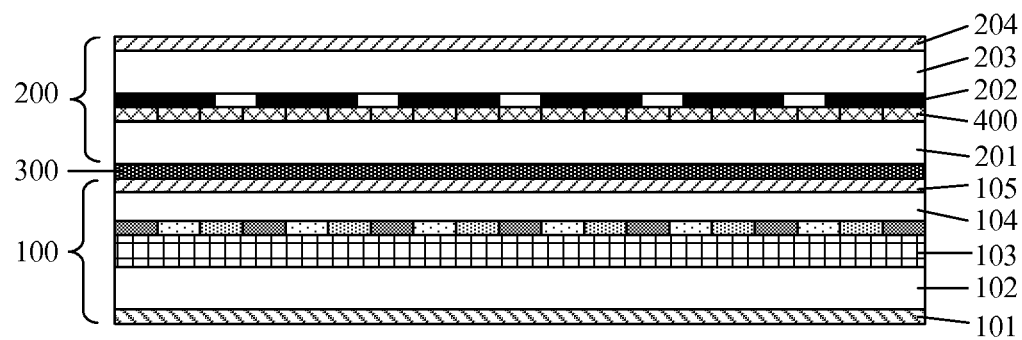
FIG. 9 is a schematic cross sectional view of a display apparatus according to a fourth exemplary embodiment of the present invention.

FIG. 9 is a schematic cross sectional view showing the display apparatus according to the fourth exemplary embodiment of the present invention, in which, the diaphragm layer 400 is arranged between the lower substrate 201 of the 3D grating 200 and the second liquid crystal layer 202 and the lower substrate 201 is adhered to the first polarizer 105 by the adhere layer 300.

In the 3D display apparatus, the 3D grating discussed in the above various embodiments of the present invention may be replaced by other 3D assemblies, for example, any one of a phase difference plate, a parallax baffle, an Active Barrier, a column lens and a liquid crystal lens. The diaphragm layer may be arranged in the plurality of layers of the display panel or the respective 3D assemblies, for example, arranged between any two layers, arranged on the surface of the display panel at the light incident side or at the light emitting side, or arranged on the surfaces of the 3D assemblies at the light incident side or at the light emitting side.

The display apparatus in the present invention may also be a 2D display apparatus, for example, a 2D liquid crystal display apparatus or an OLED display apparatus. In the 2D display apparatus, the diaphragm layer may be arranged in the plurality of layers of the display panel in the display apparatus, for example, the diaphragm layer may be arranged on the surface of the color filter substrate of the display panel opposed to the array substrate, may also be arranged between the color filter substrate and the second polarizer of the display panel. For a same brightness, the display apparatus of the present invention can reduce the power consumption.

The above embodiments are only illustrative, instead of limiting the present invention. Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display apparatus comprising a plurality of layers arranged in a light emitting direction of a light, wherein a diaphragm layer configured to enhance an emitting brightness of the display apparatus is arranged on one of the plurality of layers, and wherein the display apparatus further comprises:
    a display substrate which comprises a first liquid crystal layer in the plurality of layers, the diaphragm layer being arranged at the light emitting direction of the first liquid crystal layer; and
    a 3D assembly arranged in the light emitting direction of the display substrate and comprising a 3D grating, the 3D grating comprising:
        a lower substrate arranged in the light emitting direction of the display substrate; and
        a second liquid crystal layer arranged in the light emitting direction of the lower substrate.

2. The display apparatus according to claim 1, wherein the diaphragm layer comprises a plurality of diaphragms, each of which corresponds to one or more sub pixels of the display substrate.

3. The display apparatus according to claim 2, wherein each of the diaphragms comprises n masking bars, and a slit is formed between two adjacent masking bars.

4. The display apparatus according to claim 3, wherein the distances from two adjacent strip-like wavebands in the wavebands, formed by the masking bars and the slit in one of the diaphragms, to a focal point have a difference of $\lambda/2$, in which $\lambda$ is a wavelength of the light and the focal point is the equivalent convex lens of one of the diaphragms.

5. The display apparatus according to claim 3, wherein a reflection layer is provided on a surface of each of the masking bars facing away from a light emitting side of the masking bars.

6. The display apparatus according to claim 1, wherein the display panel further comprises:
    an array substrate arranged at a light incident side of the first liquid crystal layer;
    a color film substrate arranged at the light emitting direction of the first liquid crystal layer; and
    a first polarizer arranged at the light emitting direction of the color film substrate.

7. The display apparatus according to claim 6, wherein the 3D assembly is arranged in the light emitting direction of the first polarizer.

8. The display apparatus according to claim 7, wherein the 3D assembly comprises any one of a phase difference plate, a parallax baffle, an Active Barrier, a column lens and a liquid crystal lens.

9. The display apparatus according to claim 6, wherein the display panel further comprises a second polarizer arranged at a side of the array substrate opposed to the first liquid crystal layer.

10. The display apparatus according to claim 1, wherein the lower substrate is bonded to the first polarizer by an adhere layer.

11. The display apparatus according to claim 10, wherein the diaphragm layer is located between the color film substrate and the first liquid crystal layer.

12. The display apparatus according to claim 10, wherein the diaphragm layer is located between the color film substrate and the first polarizer.

13. The display apparatus according to claim 1, wherein the diaphragm layer is arranged at a side of the lower substrate opposed to the second liquid crystal layer and is bonded to the first polarizer by an adhere layer.

14. The display apparatus according to claim 1, wherein the diaphragm layer is arranged between the lower substrate and the second liquid crystal layer, and the lower substrate is bonded to the first polarizer by an adhere layer.

15. The display apparatus according to claim 1, wherein the 3D grating further comprises:
    an upper substrate arranged at a side of the second liquid crystal layer opposed to the lower substrate; and
    a third polarizer arranged at a side of the upper substrate opposed to the second liquid crystal layer.

* * * * *